No. 700,796. Patented May 27, 1902.
B. S. MOLYNEUX.
COIN CONTROLLED TIRE INFLATER.
(Application filed Dec. 24, 1900. Renewed Oct. 7, 1901.)
(No Model.) 3 Sheets—Sheet 1.
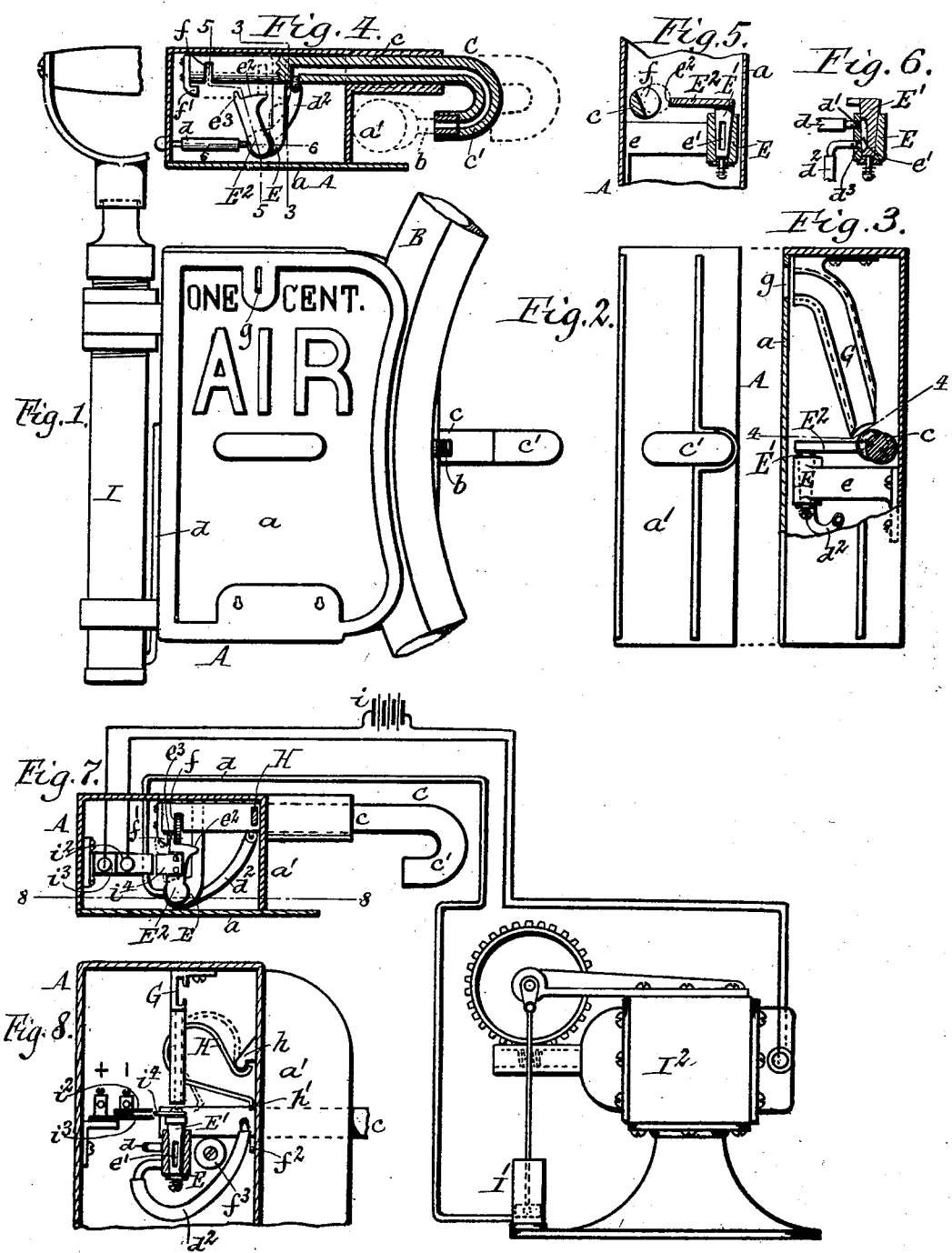
Witnesses:
F. F. Scherzinger
E. A. Volk
B. S. Molyneux Inventor
By Wilhelm Bonner
Attorneys.

No. 700,796. Patented May 27, 1902.
B. S. MOLYNEUX.
COIN CONTROLLED TIRE INFLATER.
(Application filed Dec. 24, 1900. Renewed Oct. 7, 1901.)
(No Model.) 3 Sheets—Sheet 2.
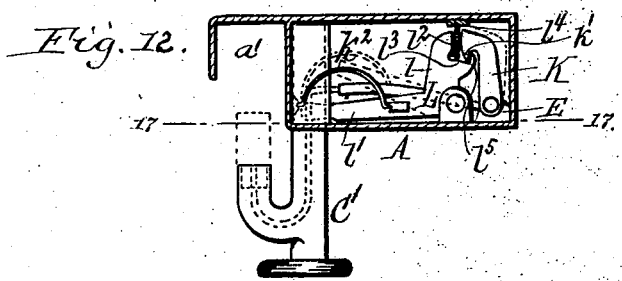
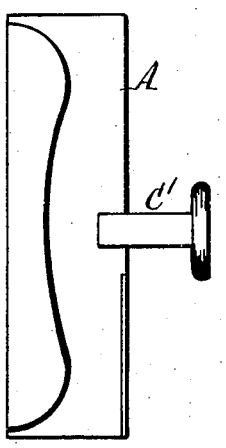
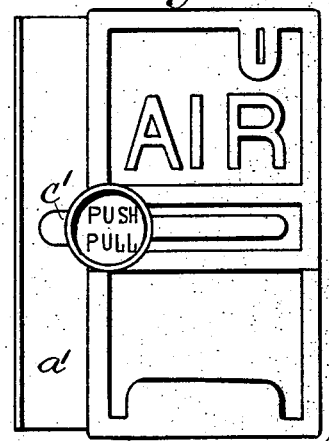
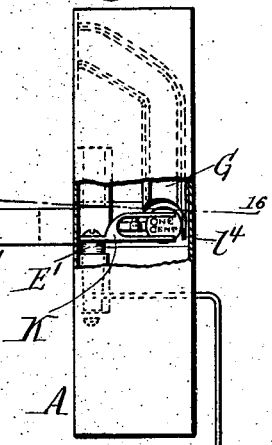
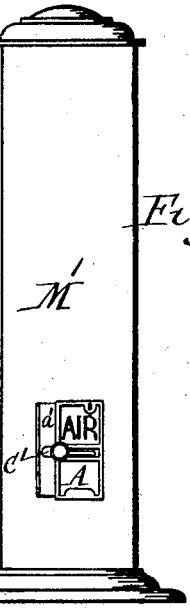
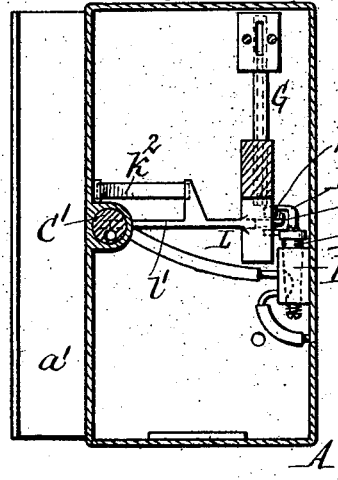
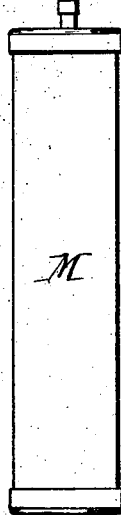
Witnesses:
F. F. Schryver
E. A. Volk
B. S. Molyneux Inventor
By Wilhelm Bonner
Attorneys
THE NORRIS PETERS CO., PHOTO-LITHO., WASHINGTON, D. C.

No. 700,796. Patented May 27, 1902.
B. S. MOLYNEUX.
COIN CONTROLLED TIRE INFLATER.
(Application filed Dec. 24, 1900. Renewed Oct. 7, 1901.)
(No Model.) 3 Sheets—Sheet 3.
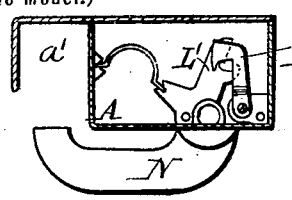
Fig. 20.
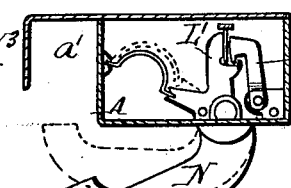
Fig. 18.
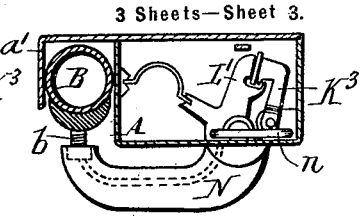
Fig. 19.
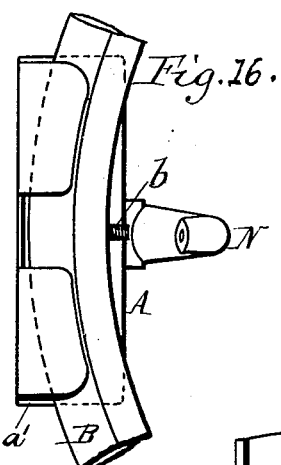
Fig. 16.
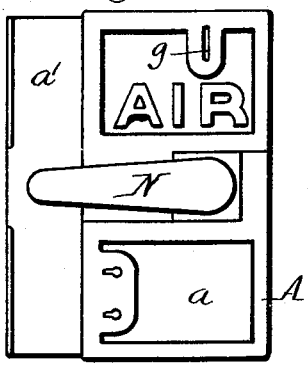
Fig. 15.
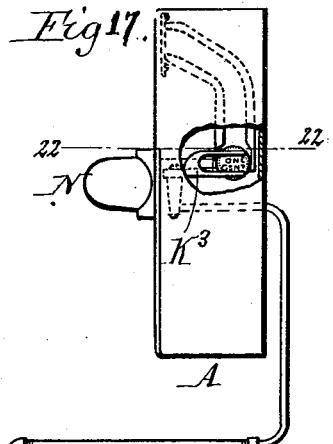
Fig. 17.
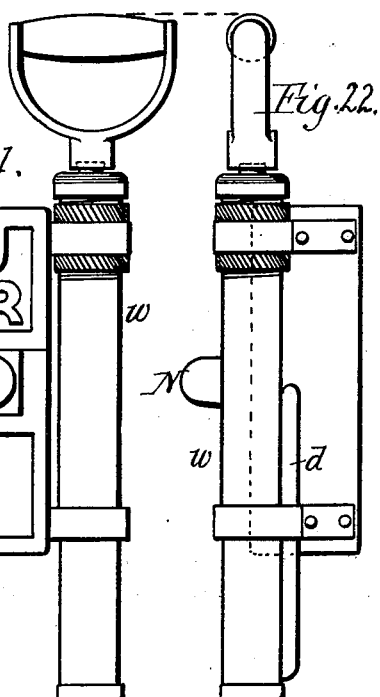
Fig. 21.
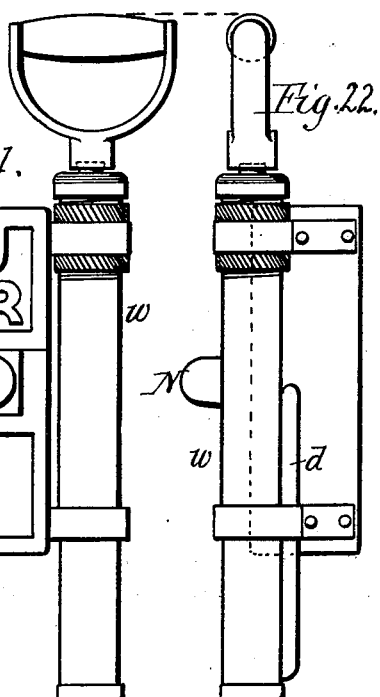
Fig. 22.
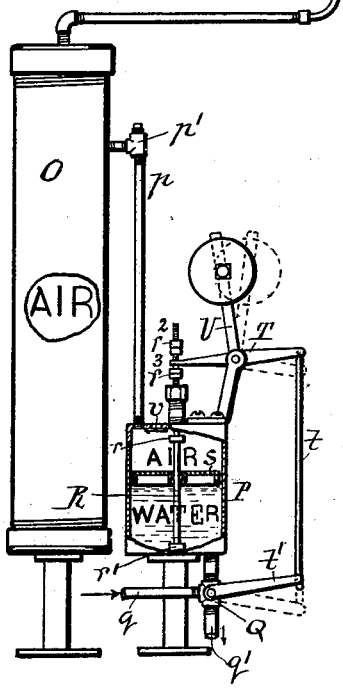
Witnesses:
F. F. Scherzinger
E. A. Volk
B. S. Molyneux Inventor
By Wilhelm Bonner
Attorneys

UNITED STATES PATENT OFFICE.

BARTON S. MOLYNEUX, OF BUFFALO, NEW YORK.

COIN-CONTROLLED TIRE-INFLATER.

SPECIFICATION forming part of Letters Patent No. 700,796, dated May 27, 1902.

Application filed December 24, 1900. Renewed October 7, 1901. Serial No. 77,866. (No model.)

*To all whom it may concern:*

Be it known that I, BARTON S. MOLYNEUX, a citizen of the United States, residing at Buffalo, in the county of Erie and State of New York, have invented new and useful Improvements in Coin-Controlled Tire-Inflaters, of which the following is a specification.

This invention relates to a coin-controlled tire-inflater.

The principal object of this invention is the production of a tire-inflater in which the air-valve is opened and closed by moving the air-delivery nozzle toward and from its operative position.

This invention has the further objects to produce a tire-inflater which will also serve as an ordinary bicycle-holder and to improve the air-supplying devices in other respects.

In the accompanying drawings, consisting of three sheets, Figure 1 is a side view of one form of my improved tire-inflater combined with a hand-operated air-pump and showing a fragment of a wheel rim and tire in position for inflating the tire. Fig. 2 is a front view of the inflater shown in Fig. 1. Fig. 3 is a fragmentary vertical section in line 3 3, Fig. 4, showing the coin-chute and valve-controlling mechanism. Fig. 4 is a horizontal section in line 4 4, Fig. 3. Fig. 5 is a fragmentary cross-section in line 5 5, Fig. 4. Fig. 6 is a vertical section in line 6 6, Fig. 4. Fig. 7 is a horizontal section of a coin-controlled tire-inflater mechanism similar to that shown in Fig. 4 and showing the same combined with an electrically-operated air-pump. Fig. 8 is a fragmentary vertical section in line 8 8, Fig. 7. Fig. 9 is a front view of a modified form of my improved tire-inflater. Fig. 10 is a side elevation thereof viewed from the left-hand side. Fig. 11 is a side elevation thereof, partly broken away, viewed from the right-hand side and showing the same supplied with compressed air from a tank, which may be located remote from the coin-controlled inflating mechanism. Fig. 12 is a horizontal section in line 16 16, Fig. 11. Fig. 13 is a vertical section in line 17 17, Fig. 12. Fig. 14 is an elevation showing my improved coin-controlled mechanism applied directly to the tank which contains the supply of air for inflating the tires. Fig. 15 is a front elevation showing another modification of my improved tire-inflater. Fig. 16 is a side view of the same viewed from the left-hand side. Fig. 17 is a side view of the same viewed from the right-hand side, partly broken away, and showing the air supplied by a pump, which is operated by a hydraulic motor. Fig. 18 is a horizontal section in line 22 22, Fig. 17, showing the coin in position preparatory to opening the valve. Fig. 19 is a similar view showing the position of the parts when the air-supply nozzle has been turned after a coin has been deposited. Fig. 20 is a similar view showing the position of the parts upon turning the air-supply nozzle when no coin has been deposited. Fig. 21 is a front elevation showing the coin-controlled apparatus illustrated in Figs. 15, 16, 18, 20 connected with a hand-operated air-pump. Fig. 22 is a side view of the same.

Like letters of reference refer to like parts in the several figures.

Referring to the construction shown in Figs. 1 to 8, A represents the casing, which incloses the mechanism controlling the outlet of the air-supply and which also serves as a till to receive the coins whereby the air-controlling mechanism is operated. This case may be secured to any suitable support, and its outer side $a$ is removable to afford access to the interior of the case for inspecting the mechanism and also for removing the coins deposited therein. The front end of the case is provided with a wheel-holding jaw, rack, or socket $a'$, which receives the tire B and rim of the bicycle or other wheel and holds the same in place while the tire is being inflated, and which can also be used as an ordinary stand or rack for holding a bicycle the tires of which do not require to be inflated.

C represents an air-supply nozzle, which is mounted on the case so that its outlet can be moved toward and from the air-inlet nipple $b$ of the tire and which is connected with a coin-operated valve, whereby the nozzle may be connected with and disconnected from an air-supply. This nozzle preferably consists of a horizontally-reciprocating plunger $c$, which is guided on the inner part of the case and which is provided at its outer end with a hollow, crooked, or reversely-bent part $c'$, which faces the open front side or mouth of the socket in which the nipple-carrying part of the tire is placed. The air-passage in the nozzle is connected within the casing with an air-supplying device by a pipe or tube containing a valve whereby the air may be admitted to or cut off from the nozzle. This pipe consists of a fixed section $d$, connected at one end with an air-supplying device and at its other end with a port $d'$ in the side of the valve-case E, and a flexible section $d^2$, connected at one end with a port $d^3$ in the valve-case and at its other end with the passage in the nozzle. The valve-case is arranged on one side of the nozzle-plunger and is supported on the case by a bracket $e$.

$E'$ represents the rotary plug of the air-valve, which is arranged in the valve-case and provided in its side with a port $e'$, whereby the ports $d'$ $d^3$ of the valve-case are connected and disconnected.

$E^2$ represents a valve-actuating rock-arm which projects from the upper end of the plug $E'$ toward the plunger and which is provided on its free end with a bearing-face $e^2$ and a shoulder or lug $e^3$ at the rear end of said face. The plunger is provided on the side facing the valve rock-arm with a recess or jaw $f$ and at its inner end with a lug or shoulder $f'$, which is in line with the lug $e^3$ of the valve-arm.

G represents an upright coin-chute, which is arranged with its upper end in rear of a coin-slot $g$ in the cover of the casing and which extends with its lower end to a point above the space between the plunger of the nozzle and the rock-arm of the air-valve. When the tire-inflater is not in use and the parts are in their normal inoperative position, the rock-arm of the valve is moved forward, so that its bearing-face is underneath the coin-chute and its plug disconnects the ports $d'$ $d^3$. The nozzle is pulled outwardly, so that its crooked outer end does not obstruct the mouth of the jaw $a'$, and the plunger-jaw $f$ is arranged opposite the bearing-face $e^2$ of the valve rock-arm and underneath the coin-chute, as represented in Figs. 7 and 8. The outward movement of the nozzle is limited when the parts are in this position by a lug or shoulder $f^2$ on the plunger engaging with the adjacent inner side of the casing, as shown in Fig. 8. In this position of the parts the nozzle can be freely reciprocated without affecting any other part and without opening the valve which controls the air-supply to the nozzle. For the purpose of inflating a tire the latter is placed in the holding-jaw on the casing with its nipple in line with the nozzle of the inflater, and then a coin is deposited into the chute, which latter conducts the coin downwardly and discharges the same in the pocket which is formed by the space between the bearing-face on the valve rock-arm and the jaw of the plunger. The coin rests at one side of its edge against the bearing-face of the valve rock-arm and at the opposite side of its edge against the bottom of the jaw or recess $f$ in the plunger. The coin is sustained between the plunger and valve rock-arm while the parts are in this position by reason of the distance from the bearing-face of the valve rock-arm and the bottom of the recess $f$ being less than the diameter of the coin, as shown in Fig. 5, whereby the coin is prevented from falling below the plunger and valve rock-arm. The nozzle is now pushed forwardly and its outlet end is pressed against the nipple of the tire, so as to establish communication with the same. During the forward movement of the nozzle its plunger pushes the coin forwardly against the lug $e^3$ of the valve-arm and turns the valve-plug so that its port $e'$ connects the ports $d'$ $d^3$ in its casing, as shown in Figs. 4 and 6, whereby the air is permitted to pass from the air-supplying device to the tire and inflate the latter. As the valve rock-arm is moved forwardly by the coin interposed between the same and the plunger of the nozzle the distance between the valve rock-arm and plunger becomes greater than the diameter of the coin, because the valve-arm swings away from the plunger, thereby causing the coin to drop between the plunger and valve-arm into the till, which is formed by the space in the casing below the plunger and valve-arm. After the tire has been inflated the nozzle is retracted, so as to permit the removal of the wheel from the supporting jaw or socket on the casing. During the outward or backward movement of the nozzle the lug $f'$ on the inner end of its plunger engages the lug $e^3$ on the valve-arm and turns the same, so that the port $e'$ of the plug is out of register with the ports $d'$ $d^3$ in the valve-case, whereby the communication between the air-supplying device and the nozzle is cut off.

The holding-jaw and the nozzle are so constructed that the nozzle when pushed fully forward obstructs the mouth of the holding-jaw sufficiently to prevent the removal of the wheel from the jaw without first retracting or moving the nozzle backwardly to clear the mouth of the holding-jaw, thereby insuring closing of the air-valve before the wheel can be removed, whereby inflation of more than one tire by the deposit of only one coin is prevented. The bearing-face $e^2$ of the valve-arm is curved concentric with the valve plug and arm and extends forwardly a sufficient distance so that a part of the bearing-face always remains below the outlet of the coin-chute. If a coin is deposited in the chute while the nozzle is in its forward or operative position, the coin is prevented from escaping from the lower end of the chute owing to the valve-arm and the solid part of the plunger, which obstruct the lower end of the chute. The coin is supported in the chute by the valve-lever and the solid part of the plunger until the latter has been drawn outwardly, so that its jaw registers with the chute, and then the coin will clear the chute and drop into the jaw of the plunger. By this means the purchaser does not lose the coin when the same is not deposited at the right time.

The inner end of the plunger is preferably supported by a roller $f^3$, pivoted on the casing and engaging with the under side of the plunger, as shown in Fig. 8. The plunger is yieldingly held in either its forward or backward position by a retaining bow-spring H, which engages at its fixed end against a lug $h$ on the casing, while its free end engages with a notch $h'$ in the plunger, as shown in Fig. 8. In the retracted or forward position of the plunger the free end of the spring is in front of its fixed end, as shown in full lines in Fig. 8, and the spring tends to hold the plunger in this position. Upon pushing the plunger forward until the free end of the retaining-spring passes the dead-center the spring completes the forward movement of the plunger and holds the nozzle yieldingly against the tire-nipple.

Any suitable means may be provided for supplying the air for inflating the tire. As shown in Fig. 1, a hand-operated pump is employed, the cylinder I of which has its outlet connected with the pipe $d$, leading to the controlling-valve.

If desired, the air may be supplied by an electrically-operated pump I', as shown in Fig. 7. The motor $I^2$ of this pump is included in an electric circuit containing a generator $i$ and two terminal contacts $i^2$ $i^3$, which are arranged in the casing of the controlling mechanism adjacent to a switch blade or contact $i^4$ on the valve-arm, as shown in Figs. 7 and 8. Upon turning the valve-arm so as to open the valve the contact $i^4$ on the arm connects the contacts $i^2$ $i^3$, thereby closing the circuit and operating the motor which drives the air-pump I'. Upon retracting the plunger and turning the valve-arm backwardly the valve is closed and the circuit is broken, thereby stopping the supply of air.

Instead of operating the valve directly from the reciprocating plunger of the nozzle the movement of the plunger may be transmitted by intermediate devices to the valve, such a construction being shown in Figs. 9 to 13. In the construction shown in these figures K represents a bifurcated valve-arm, which is secured to the plug of the valve. L represents a rocking trip-lever, which is pivoted on the inner side of the casing and provided with a presser-arm $l$, which stands opposite the space between the bifurcations of the valve-arm K, while its opposite actuating-arm $l'$ is connected with the plunger of the reciprocating nozzle C'. The presser-arm of the trip-lever is provided with a presser-face $l^2$, which faces the valve-arm, and a supporting-face $l^3$, which faces a lip $l^4$ of the lower end of the coin-chute when the trip-lever is retracted by the plunger and in position to receive a coin. Upon reciprocating the nozzle-plunger when no coin is deposited the trip-lever moves forward and backward between the bifurcations of the valve-arm without opening the valve.

Upon depositing a coin in the chute the same drops between the presser-arm and valve-arm and rests with its opposite edges on the lip $l^4$ of the chute and the supporting-face $l^3$ of the trip-lever, as shown in Fig. 12. Upon pushing the plunger forwardly while the coin is in this position the trip-lever turns the valve-arm through the medium of the coin and opens the valve. The space between the supporting-face $l^3$ and the lip $l^4$ is less than the diameter of the coin, so that the latter cannot escape therefrom until the trip-lever has moved the coin beyond the lip $l^4$ of the chute and moved backward slightly, and then the coin is released and dropped into the casing. Upon moving the nozzle outwardly to release the tire from the holding-jaw on the case the trip-lever also turns the valve-arm backwardly for closing the valve by means of a hook $l^5$ on the trip-lever engaging with a hook $k'$ on one of the bifurcations of the valve-arm, as represented in Figs. 11, 12, and 13. The nozzle-plunger and trip-lever are held yieldingly either in the forward or backward position by a bow-spring $k^2$, interposed between the trip-lever and the casing, as shown in Figs. 12 and 13.

In Fig. 11 the controlling-valve is shown connected by a pipe with a tank M, which may contain a charge of compressed air or a gas-producing mixture and which is located at a place remote from the controlling mechanism.

In Fig. 14 the coin-controlled mechanism is shown attached to a gas or air supplying tank M'.

Figs. 15 to 20 illustrate a modification of my invention in which the nozzle oscillates toward and from the wheel-holding jaw. In this construction L' and $K^3$ represent a coöperating trip-lever and a valve-arm, respectively, which are constructed substantially like the trip-lever and valve-arm of the modification shown in Figs. 9 to 13. N represents a hollow nozzle which is connected at its inner end with the trip-lever L' and which moves with its free outer end toward and from the wheel-holding jaw of the case. A flexible outlet tube or pipe $n$ extends from the valve-case to the passage in the nozzle, as shown in Fig. 19. The manner of opening and closing the valve in this construction upon depositing a coin is the same as in the construction shown in Figs. 9 to 13.

In Fig. 17 the controlling-valve is connected with an air-supply tank O, into which air is delivered by a hydraulic air-pumping device, which is constructed as follows: P represents an upright pump-cylinder, which is connected at its upper end with the air-tank O by a pipe $p$, containing a check-valve $p'$. Q represents a three-way cock of usual construction, which has its nipples connected respectively with the bottom of the cylinder, a water-supply pipe $q$, and a waste-pipe $q'$. R represents a shipper-rod arranged within the cylinder and provided inside of the cylinder with upper and lower tappets $r\ r'$ and outside of the cylinder with upper and lower tappets $r^2\ r^3$. $s$ represents a float arranged in the cylinder and adapted to engage the upper and lower internal tappets. T represents a rock-lever having one arm arranged between the external tappets $r^2\ r^3$, while its other arm is connected by a rod $t$ with an arm $t'$ on the plug of the three-way cock. U represents a weight-arm arranged on the rock-lever T and adpted to swing from one side of the dead-center to the other. When the float is in its lowered position, it engages the lower tappet $r'$, and its weight depresses the shipper-rod and turns the three-way cock through the medium of the intermediate connecting mechanism, so as to connect the lower end of the cylinder with the water-supply. This causes the water entering the cylinder to raise the float and the air in the upper part of the cylinder to be expelled into the tank O. During the last part of the upward movement of the float it engages the upper tappet and raises the shipper-rod, thereby turning the three-way cock, so as to close the water-supply and connect the cylinder with the waste-pipe, thereby causing the water to escape and the float to descend, during which time air is permitted to enter the upper end of the cylinder through a check-valve $v$ in the upper part of the cylinder. During the last part of the downward movement of the float it strikes the lower tappet of the shipper-rod and shifts the three-way cock, so as to deliver another charge of air into the tank O.

The rock-lever T has sufficient play between the external tappets $r^2\ r^3$, so as to permit the weighted arm U after passing the dead-center in either direction to quickly complete the movement of the three-way cock in either direction.

Figs. 21 and 22 show the modified construction of the controlling mechanism illustrated in Figs. 15 to 20 combined with a hand-operated pump $w$.

I claim as my invention—

1. The combination with a wheel-holding jaw or rack, of an air-supply conduit, an air-delivery nozzle which is movable toward and from said jaw or rack, means for guiding said nozzle, and a coin-controlled mechanism whereby the supply of air to said nozzle is controlled, substantially as set forth.

2. The combination with a wheel-holding jaw or rack, of an air-supply conduit, an air-delivery nozzle which is movable toward and from said jaw or rack, means for guiding said nozzle, a valve arranged in the air-supply conduit, and a coin-controlled mechanism whereby said valve is opened, substantially as set forth.

3. The combination with a wheel-holding jaw or rack and a coin-operated valve which controls an air-supply conduit, of a movable air-delivery nozzle which is connected with said conduit and which is movable toward and from the tire to be inflated, and a spring whereby the nozzle is yieldingly held in its forward or backward position, substantially as set forth.

4. The combination with a wheel-holding jaw or rack, of an air-supply conduit, an air-delivery nozzle having its discharge end movable toward and from the mouth of said jaw or rack for locking the wheel in the same, means for guiding the discharge end of said nozzle, a valve which controls the flow of the air to said nozzle, and a coin-controlled mechanism whereby said valve is opened, substantially as set forth.

5. The combination with a wheel-holding jaw or rack, of an air-supply conduit, a sliding air-delivery nozzle arranged on one side of said jaw or rack and having a bent discharge end which faces the mouth of said jaw or rack, means for guiding said nozzle, a valve which controls the flow of the air to said nozzle, and a coin-controlled mechanism whereby said valve is opened, substantially as set forth.

6. The combination with a wheel-holding jaw or rack and a fixed air-supply conduit connected therewith, of a sliding air-delivery nozzle arranged on one side of said jaw or rack and having a bent discharge end which faces the mouth of said jaw or rack, means for guiding said nozzle, a flexible pipe connecting said fixed conduit with said nozzle, a valve which controls the flow of the air to said nozzle, and a coin-controlled mechanism whereby said valve is opened, substantially as set forth.

7. The combination of a wheel-holding jaw or rack, an air-delivery nozzle movable toward and from said jaw or rack, air-supply means controlled by the movement of said air-delivery nozzle, and coin-controlled mechanism whereby the movement of said delivery-nozzle is controlled, substantially as set forth.

Witness my hand this 22d day of December, 1900.

BARTON S. MOLYNEUX.

Witnesses:
C. B. HORNBECK,
THEO. L. POPP.